United States Patent
Kohnke (10) Patent No.: US 9,032,251 B2
(45) Date of Patent: May 12, 2015

(54) RE-FORMING AN APPLICATION CONTROL TREE WITHOUT TERMINATING THE APPLICATION

(71) Applicant: Cray Inc., Seattle, WA (US)

(72) Inventor: Marlys Kohnke, Mendota Heights, MN (US)

(73) Assignee: Cray Inc., Seattle, WA (US)

( * ) Notice: Subject to any disclaimer, the term of this patent is extended or adjusted under 35 U.S.C. 154(b) by 146 days.

(21) Appl. No.: 13/797,342

(22) Filed: Mar. 12, 2013

(65) Prior Publication Data

US 2014/0281663 A1 Sep. 18, 2014

(51) Int. Cl.
G06F 11/00 (2006.01)
G06F 11/14 (2006.01)
H04L 12/753 (2013.01)

(52) U.S. Cl.
CPC ........ *G06F 11/1402* (2013.01); *G06F 11/1425* (2013.01); *H04L 45/48* (2013.01)

(58) Field of Classification Search
CPC .. H04L 45/48; G06F 11/0709; G06F 11/1425
USPC ........... 714/3, 4.1, 4.2, 10; 370/217, 221, 256
See application file for complete search history.

(56) References Cited

U.S. PATENT DOCUMENTS

| | | | | |
|---|---|---|---|---|
| 5,606,669 A | * | 2/1997 | Bertin et al. | 709/223 |
| 5,805,578 A | * | 9/1998 | Stirpe et al. | 370/255 |
| 5,941,955 A | * | 8/1999 | Wilby et al. | 709/242 |
| 6,584,075 B1 | * | 6/2003 | Gupta et al. | 370/256 |
| 7,088,684 B2 | * | 8/2006 | Novaes et al. | 370/256 |
| 7,089,323 B2 | * | 8/2006 | Theimer et al. | 709/238 |
| 7,117,273 B1 | * | 10/2006 | O'Toole et al. | 709/252 |
| 7,984,453 B2 | | 7/2011 | Alverson et al. | |
| 8,103,750 B2 | * | 1/2012 | O'Neal et al. | 709/221 |
| 8,402,465 B2 | | 3/2013 | Kohnke | |
| 2003/0115340 A1 | * | 6/2003 | Sagula et al. | 709/228 |
| 2004/0153572 A1 | * | 8/2004 | Walker et al. | 709/239 |
| 2005/0086469 A1 | * | 4/2005 | Dunagan et al. | 713/163 |
| 2010/0121904 A1 | | 5/2010 | Karo | |
| 2011/0110269 A1 | * | 5/2011 | Maenpaa | 370/254 |
| 2011/0225226 A1 | * | 9/2011 | Archer et al. | 709/201 |

OTHER PUBLICATIONS

Ye Tian, Hong Shen, and Kam-Wing Ng; "Improving Reliability for Application-Layer Multicast Overlays;" IEEE Transactions on Parallel and Distributed Systems, vol. 21, No. 8; Aug. 2010; pp. 1103-1116.*

Karo, Michael et al., "Application Placement and Monitoring," Cray Inc., Exhibit A, Jun. 22, 2011, 100 pages.

Karo, Michael et al., "The Application Level Placement Scheduler," Cray User Group, May 8, 2006, 7 pages.

* cited by examiner

*Primary Examiner* — Joseph Kudirka
(74) *Attorney, Agent, or Firm* — Perkins Coie LLP (57) ABSTRACT

A reconnection system re-forms a control tree for an application that is executed in parallel without terminating execution of the application. The reconnection system detects when a node of a control tree has failed and directs the nodes that have not failed to reconnect to effect the re-forming of the control tree without the failed node and without terminating the application. Upon being directed to reconnect, a node identifies new child nodes that are to be its child nodes in the re-formed control tree. The node maintains the existing connection with each of its current child nodes that is also a new child node, terminates the existing connection with each of its current child nodes that is not also a new child node, establishes a new connection with any new child node that is not a current child node, and directs each new child node to reconnect.

20 Claims, 8 Drawing Sheets

RE-FORMING AN APPLICATION CONTROL TREE WITHOUT TERMINATING THE APPLICATION

BACKGROUND

Massively parallel processing ("MPP") systems may have tens of thousands of nodes connected via a communications mechanism. Each node may include a processor, a memory, and a communications interface to a network interconnect. The nodes of an MPP system may be designated as service nodes or compute nodes. Compute nodes are primarily used to perform computations. A service node may be dedicated to providing operating system and programming environment services (e.g., file systems, external I/O, compilation, editing, etc.) to applications that execute on the compute nodes and to users logged in to the service nodes. The operating system services may include I/O services (e.g., access to mass storage), processor allocation services, log in capabilities, and so on. The service nodes and compute nodes may employ different operating systems that are customized to support the processing performed by the node. Because MPP systems have thousands of nodes with many different possible points of failure, it is likely failures would not be uncommon. The monitoring for and reporting of these failures can be provided by an event notification system as described in U.S. Pat. No. 7,984,453, entitled "Event Notifications Relating to System Failures in Scalable Systems," which is hereby incorporated by reference.

An application may execute in parallel with instances of the application executing on thousands of compute nodes. To execute such an application, a service node may allocate the needed compute nodes and then distribute the application to each allocated compute node, which proceeds to execute one or more instances of the application. The compute nodes may establish connections with other compute nodes so that control information can be sent between the compute nodes. An application level placement scheduler system ("ALPS system") provides such allocation, distribution, and establishment. Aspects of the ALPS system are described in U.S. Patent Publication No. 2010-0121904, entitled "Resource Reservations in a Multiprocessor Computing Environment," which is hereby incorporated by reference.

Figure 1:
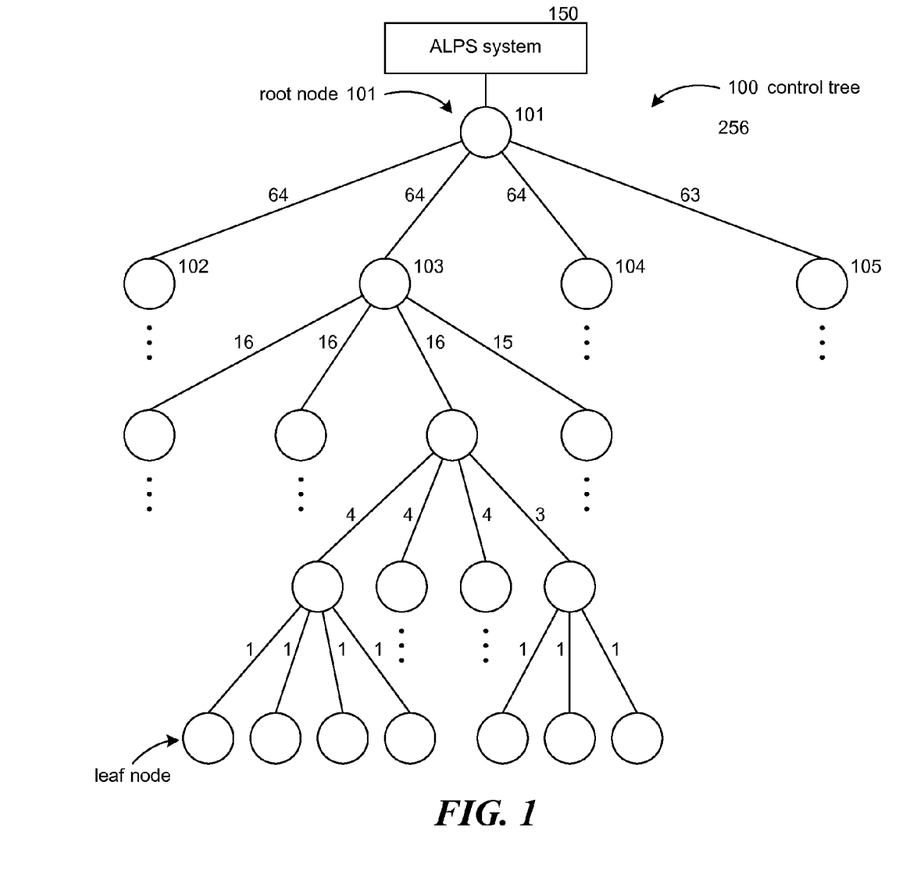
FIG. 1 illustrates an example organization of a control tree.

The ALPS system employs a tree structure organization for the connections between the compute nodes for sending control information. The compute nodes and the connections thus form a control tree with the compute nodes having a parent-child relationship. The control tree has a fan-out number (e.g., 32) that represents the maximum number of child nodes of a parent node. The fan-out number may be configurable. After the ALPS system allocates the compute nodes, it passes a placement list that identifies those compute nodes to one of the allocated compute nodes that is designated as the root node of the control tree. The ALPS system communicates with the allocated compute nodes through the compute node that is the root node of the control tree. The root node identifies nodes from the placement list to be its child nodes. The root node establishes connections with its child nodes and subscribes to receive notifications of failures relating to its child nodes from the event notification system. The root node provides the placement list to each of its child nodes so that each child node can establish a connection as a parent node of other nodes in the placement list as its child nodes. Each node may employ an algorithm to uniquely identify its child nodes. The application is also loaded by each of the nodes in the control tree. FIG. 1 illustrates an example organization of a control tree. The ALPS system 150 executing on a service node establishes a connection with control tree 100 via the root node 101. Control tree 100 includes nodes represented as circles and connections represented as lines between the circles. In this example, the fan-out number is 4 and the number of allocated nodes is 256. The root node 101 receives from the ALPS system an indication of the application and a placement list identifying the 256 nodes including the root node. The root node selects four nodes from the 255 remaining nodes (i.e., nodes other than the root node) to be child nodes 102-105, establishes a connection with each child node, and passes the placement list to each child node. Each child node then repeats a similar process for establishing connection with its child nodes. The sub-tree of each child node is assigned a block of compute nodes that includes the child node itself and the compute nodes that are to be descendant nodes of that child node. Child node 102 is assigned 64 compute nodes including child node 102 itself; child node 103 is assigned 64 compute nodes including child node 103 itself; child node 104 is assigned 64 compute nodes including child node 104 itself; and child node 105 is assigned 63 compute nodes including child node 105 itself. Each child node 102-105 selects by a selection algorithm four nodes from its block to be its child nodes, establishes a connection with its child nodes, and passes the placement list to its child nodes. This process is repeated at each child node until a child node, referred to as a leaf node, is the only node in a block.

The ALPS system and the nodes in the control tree subscribe to the event notification system to receive failure messages relating to the nodes. Each node may subscribe to receive events from its parent node and its child nodes. In addition, the ALPS system and the nodes may generate failure messages that may not be detected by the event notification system. When a failure is detected, the ALPS system directs the termination of the application. Each of the nodes is directed to stop executing the application and close its connections. The ALPS system then deallocates the nodes and other resources that were allocated to the application. Depending on the sophistication of the application, the application may need to have its execution restarted from the beginning or from a checkpoint. In either case, however, the ALPS system would need to again allocate nodes for the application and build a new control tree from scratch.

As the number of nodes allocated to an application increases, the chances of having a failure increases and the chances of an application completing without receiving a failure message decreases. As a result, significant computing resources may be expended terminating applications, allocating nodes, building new control trees, and restarting terminated applications.

DETAILED DESCRIPTION

A method and system for re-forming a control tree for an application that is executed in parallel without terminating execution of the application is provided. In some embodiments, a reconnection system detects when a node of a control tree has failed and then directs the nodes that have not failed to reconnect to effect the re-forming of the control tree without the failed node and without terminating the instances of the application executing at nodes that have not failed. Upon being directed to reconnect, a node identifies from the nodes that have not failed new child nodes that are to be its child nodes in the re-formed control tree. A new child node of a node may have, prior to the failure, been a child node of that node or a child node of another node. The node maintains the existing connection with each of its current child nodes that is also a new child node. The node also terminates the existing connection with each of its current child nodes that is not also a new child node. The node establishes a new connection with any new child node that is not a current child node. The node directs each new child node to reconnect. Because the node maintains the existing connections with current child nodes that are also new child nodes, the reconnection system avoids having to terminate all existing connections and to establish all new connections as would be needed to rebuild a new control tree from scratch. In addition, the reconnection system avoids the overhead incurred by prior systems that respond to a failure by terminating the application, deallocating the nodes, reallocating the nodes, and restarting the application.

In some embodiments, a controller executing on a service node controls the initial launching of an application that is to execute in parallel at multiple compute nodes. The controller requests an allocation system to allocate various resources including the compute nodes that are needed to execute the application. The allocation system returns to the controller a placement list that identifies the nodes that are allocated to the application. The controller then selects a node of the placement list as the root node and directs the root node to initiate the building of the control tree and the executing of the application using the nodes of the placement list. The reconnection system stores the placement list locally at each node. Alternatively, the reconnection system may store the placement list in shared memory that is accessible by all the nodes. The application may be launched with an execution parameter that may be a reconnect flag indicating whether the reconnection system should re-form the control tree when a failure occurs.

In some environments, if the reconnect flag is set and the controller detects an error, the controller directs the re-forming of the control tree. The controller first identifies the node or nodes that have failed. The failure message may identify the node or nodes that have failed. To ensure that all the nodes that have failed have been identified, the controller may delay the start of the re-forming of the control tree to allow for additional failure messages to be received. The controller may also request an application level placement scheduler system to identify all the nodes in the placement list that have failed. Once the failed nodes have been identified, the controller provides an indication of the failed nodes to the root node and directs the root node to re-form the control tree without the failed nodes. The root node selects its new child nodes from the nodes in the placement list that have not failed. The root node then divides the new child nodes into a fan-out number of blocks and selects as its new child nodes one node from each block. The root node then determines whether any of its current child nodes are new child nodes. If so, the root node keeps the connections with those current child nodes. The root node also determines whether any of the current child nodes are not new child nodes. A current child node that is not a new child node may have failed or may be designated to be connected to a different parent node in the re-formed control tree. For any such current child node, the root node terminates the connection with that current child node. The root node also determines whether any of the new child nodes are not current child nodes. If so, the root node establishes a connection with those new child nodes. The root node provides an indication of failed nodes to each new child node and directs each new child node to re-form a portion of the control tree corresponding to its block of nodes. The root node also unsubscribes to failure messages for each child node that is no longer connected and subscribes to failure messages for each child node that is newly connected.

Each child node of the root node then performs a similar process to that performed by the root node to effect the re-forming of its portion of the control tree. If the controller detects that a failure has occurred in the root node, then the controller selects as a new root node a node from the placement list that has not failed. If a node fails during the re-forming of the control tree, then the controller restarts the re-forming of the control tree with that node added as a failed node. The number of nodes in the re-formed control tree may not be sufficient for the application to complete in an effective and timely manner. In such a case, upon receiving a list of the failed nodes, the application may decide to terminate.

Figure 2:
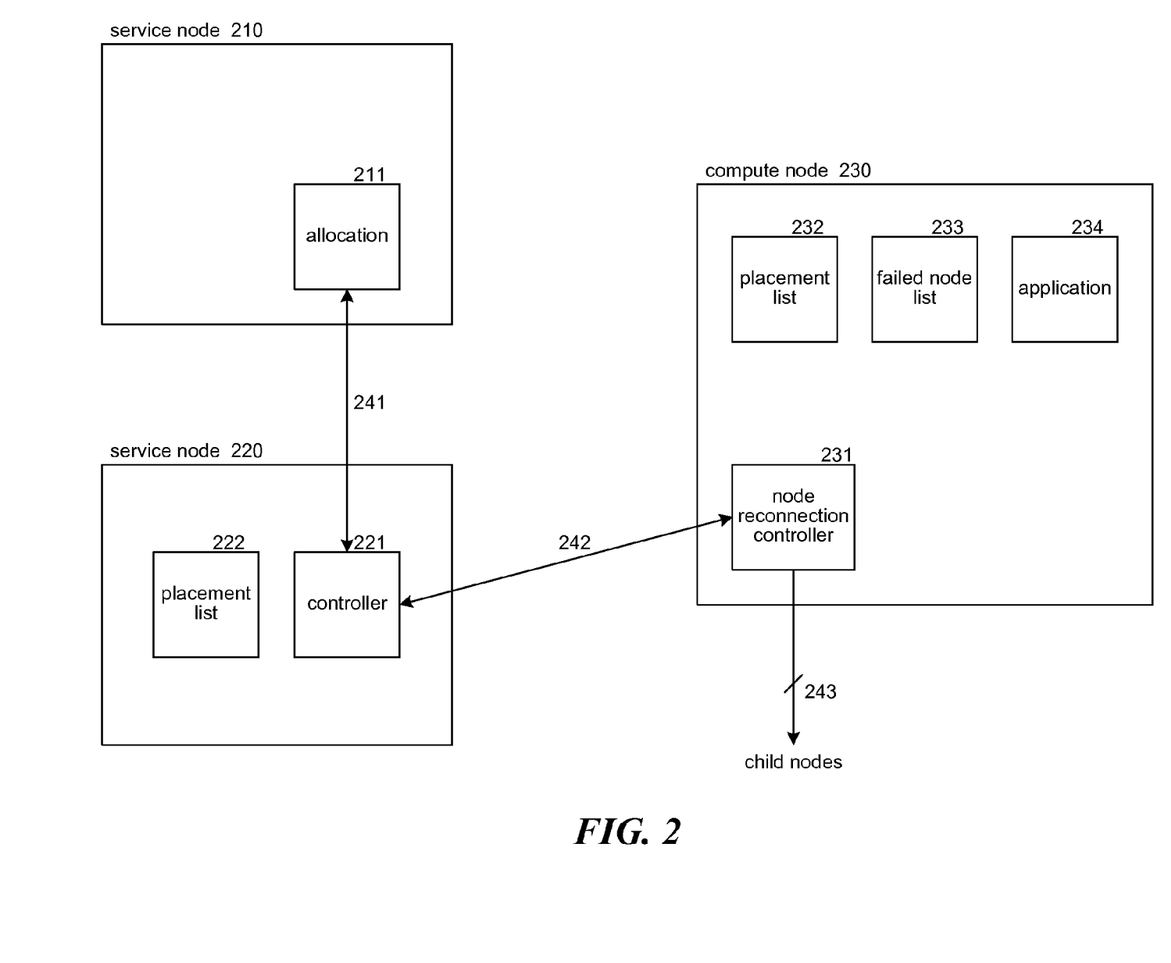
FIG. 2 is a block diagram that illustrates components of the reconnection system in some embodiments.

FIG. 2 is a block diagram that illustrates components of the reconnection system in some embodiments. The diagram illustrates service node 210, service node 220, and compute node 230. The service node 210 is connected to the service node 220 via connection 241. The illustrated components may be implemented as functions or subroutines that execute on the nodes. The service node 210 includes an allocation component 211 that allocates the resources for an application that is to execute in parallel on the compute nodes. The service node 220 includes a controller 221 and a placement list 222. To launch an application, the controller requests the allocation component to allocate compute nodes to the application. The allocation component returns a placement list that identifies each allocated node to the controller. The controller then selects a root node from among the nodes in the placement list (e.g., the first node in the list) and directs the root node to form a control tree with the nodes in the placement list for execution of the application. The service node 220 is connected to the root compute node via connection 242. Each compute node 230 includes a node reconnection controller 231, a placement list 232, a failed node list 233, and an application 234. The node reconnection controller executing at each node that is allocated for executing one or more instances of the application performs the functions of the initial forming of a control tree and the subsequent re-forming of the control tree when a failure is detected. The reconnection system comprises the controller and the node reconnection controller. Each compute node is connected to its child nodes via connections 243. Although not shown in FIG. 2, the health of the compute nodes may be monitored by an event notification system that provides event notifications of health to nodes that subscribe to the health of other nodes.

The processors on which the reconnection system may be implemented may include a central processing unit and input devices (e.g., keyboard and pointing devices), output devices (e.g., display devices), and storage devices (e.g., disk drives). The processors may access computer-readable media that includes computer-readable storage media and data transmission media. The computer-readable storage media includes memory and other tangible storage devices that may have recorded upon or may be encoded with computer-executable instructions or logic that implements the reconnection system. The data transmission media is media for transmitting data using signals or carrier waves (e.g., electromagnetism) via a wire or wireless connection.

The reconnection system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments.

Figure 3:
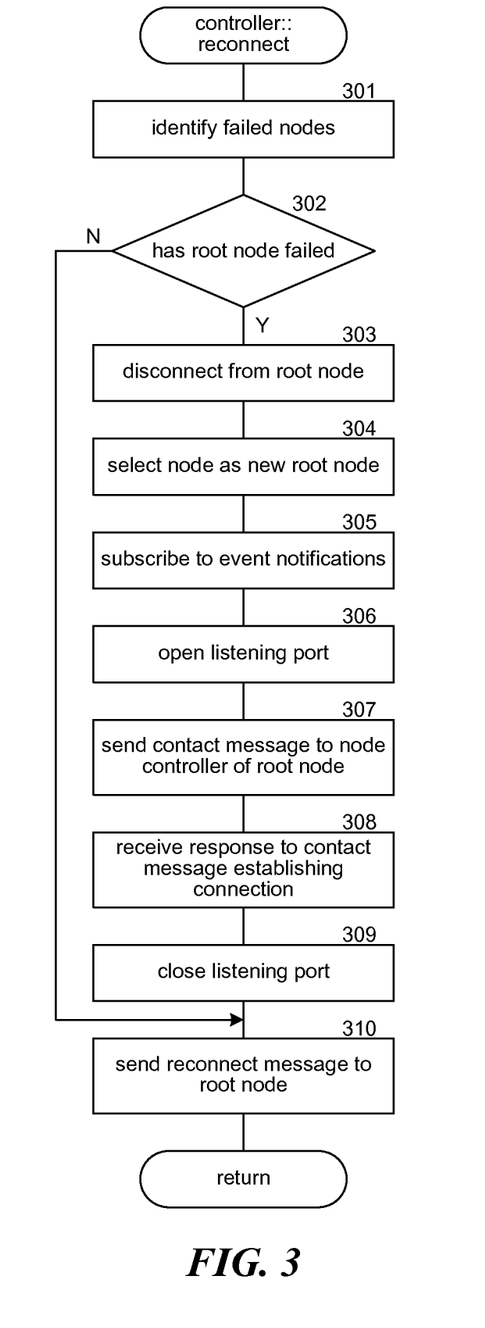
FIG. 3 is a flow diagram that illustrates the processing of a reconnect component of the controller of the reconnection system in some embodiments.

FIG. 3 is a flow diagram that illustrates the processing of a reconnect component of the controller of the reconnection system in some embodiments. The reconnect component is invoked when a failure in a node of a control tree has been detected. The component then directs the re-forming of the control tree. In block 301, the component identifies the nodes that have failed. In decision block 302, if the root node has failed, then the component continues at block 303, else the component continues at block 310. In block 303, the component disconnects from the failed root node by closing the existing connection with the root node if not already closed and unsubscribing from receiving notifications of failures of the failed root node. In block 304, the component selects a node in the placement list that has not failed as a new root node. In block 305, the component subscribes to receive notifications of failures in the root node. In block 306, the component opens a listening port for listening to a response from the new root node. In block 307, the component sends a contact message to the node reconnection controller of the new root node. In block 308, the component receives a response to the contact message through the listening port that establishes the connection between the controller and the root node. In block 309, the component closes the listening port. In block 310, the component sends a reconnect message to the root node and then returns.

Figure 4:
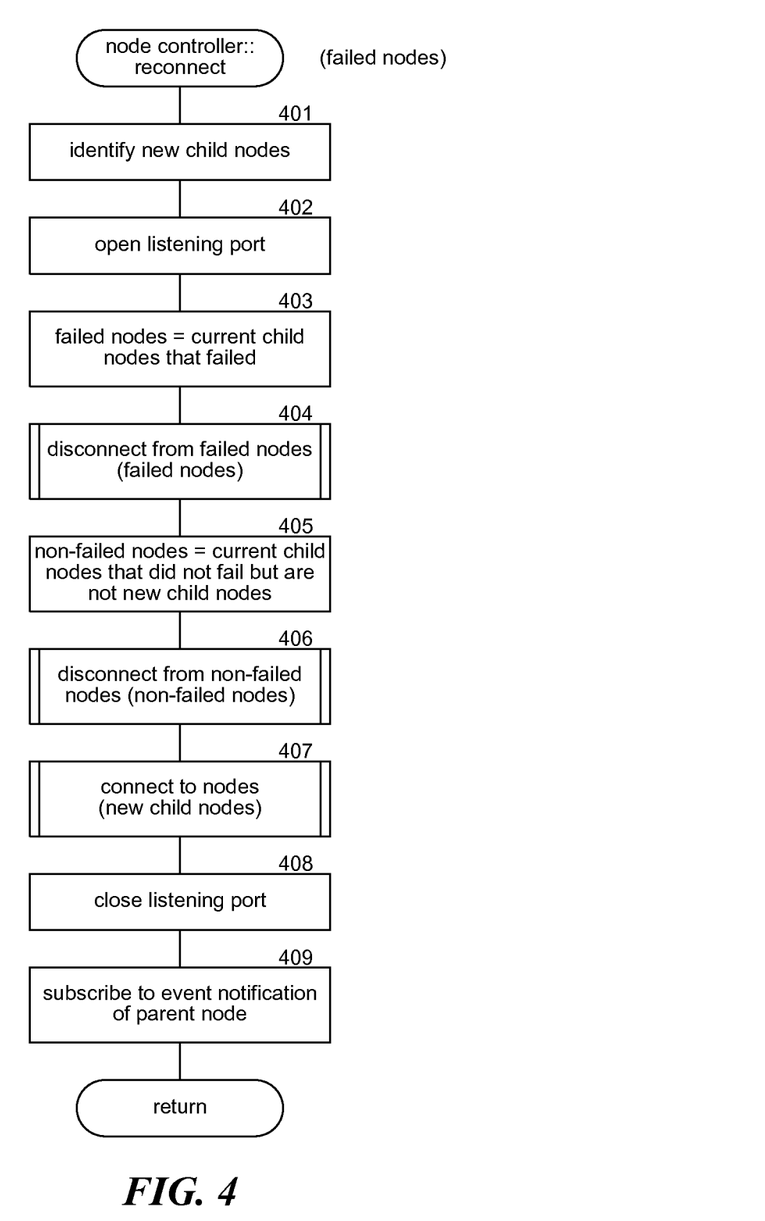
FIG. 4 is a flow diagram that illustrates the processing of a reconnect component of the node reconnection controller in some embodiments.

FIG. 4 is a flow diagram that illustrates the processing of a reconnect component of the node reconnection controller in some embodiments. The component is invoked when a node receives a reconnect message. The component may be passed an indication of the failed nodes. The component identifies new child nodes for the node, disconnects from former child nodes, maintains the connections with current child nodes that are new child nodes, and establishes connections with new child nodes that are not current child nodes. In block 401, the component identifies new child nodes. New child nodes may be identified from a placement list and a list of failed nodes. In block 402, the component opens a listening port at the node. In block 403, the component identifies the failed nodes that are current child nodes. In block 404, the component invokes the disconnect from failed nodes component passing an indication of the failed nodes to disconnect from those failed nodes. In block 405, the component identifies the non-failed nodes that are current child nodes but that are not new child nodes. In block 406, the component invokes the disconnect from non-failed nodes component passing an indication of the non-failed nodes identified in block 405 to disconnect from those non-failed nodes. In block 407, the component invokes the connect to nodes component passing an indication of the new child nodes to maintain connections with new child nodes that are current child nodes and to establish new connections with new child nodes that are not current child nodes. In block 408, the component closes the listening port. In block 409, the component subscribes to event notifications of its parent node if new and then returns.

Figure 5:
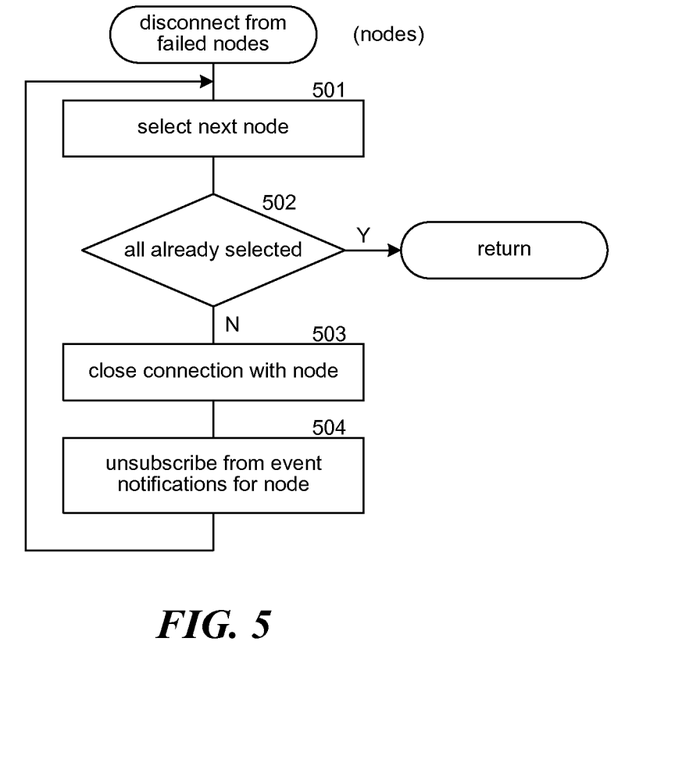
FIG. 5 is a flow diagram that illustrates the processing of a disconnect from failed nodes component of the reconnection system in some embodiments.

FIG. 5 is a flow diagram that illustrates the processing of the disconnect from failed nodes component of the reconnection system in some embodiments. The component is passed a list of failed nodes and disconnects from those failed nodes. In block 501, the component selects the next node in the list. In decision block 502, if all the nodes in the list have already been selected, then the component returns, else the component continues at block 503. In block 503, the component closes the connection with the selected node. In block 504, the component unsubscribes from event notifications for the selected node and then loops to block 501 to select the next node in the list.

Figure 6:
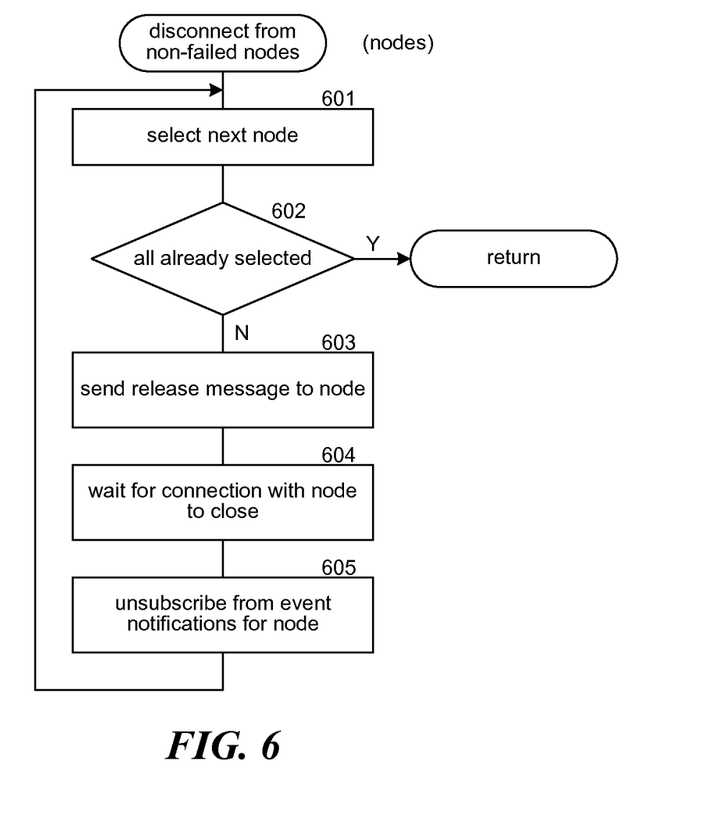
FIG. 6 is a flow diagram that illustrates the processing of a disconnect from non-failed nodes component of the reconnection system in some embodiments.

FIG. 6 is a flow diagram that illustrates the processing of the disconnect from non-failed nodes component of the reconnection system in some embodiments. The component is passed a list of current child nodes that did not fail but are not new child nodes and disconnects from those nodes. In block 601, the component selects the next node in the list. In decision block 602, if all the nodes of the list have already been selected, then the component returns, else the component continues at block 603. In block 603, the component sends a release message to the selected node. In block 604, the component waits for the connection with the selected node to close. In block 605, the component unsubscribes from event notifications for the selected node and then loops to block 601 to select the next node in the list.

Figure 7:
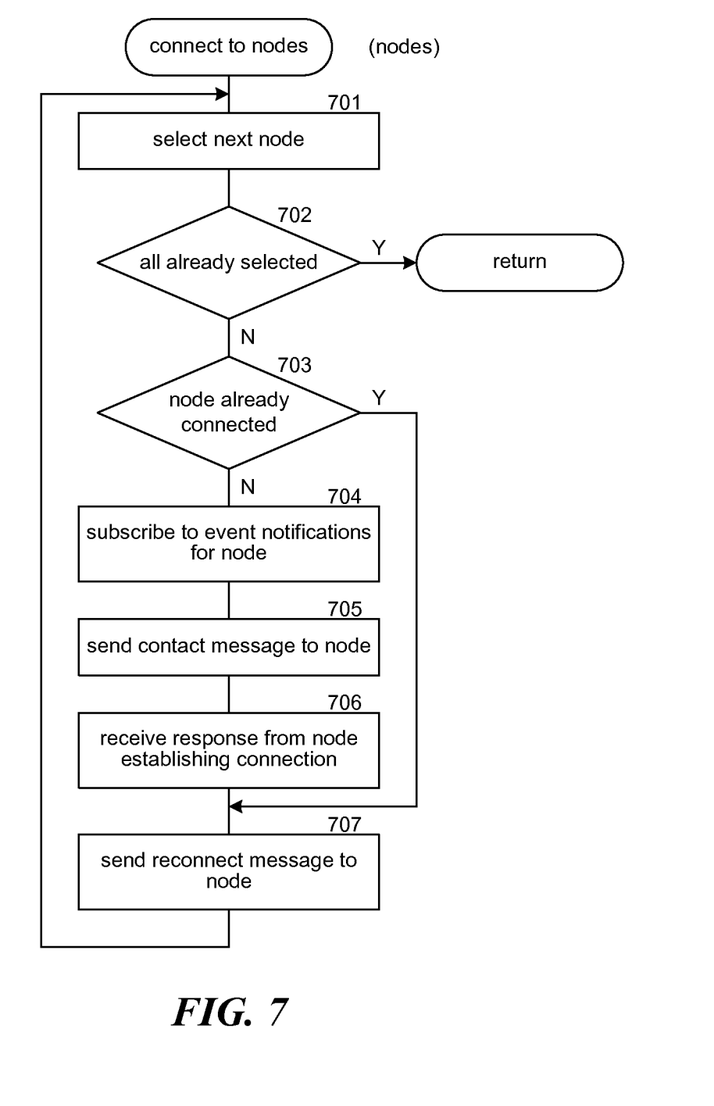
FIG. 7 is a flow diagram that illustrates the processing of a connect to nodes component of the reconnection system in some embodiments.

FIG. 7 is a flow diagram that illustrates the processing of the connect to nodes component of the reconnection system in some embodiments. The component is passed a list of the new child nodes and maintains connections with the current child nodes in the list and establishes new connections with the nodes in the list that are not current child nodes. In block 701, the component selects the next node in the list. In decision block 702, if all the nodes in the list have already been selected, then the component returns, else the component continues at block 703. In decision block 703, if the selected node is already connected, then the component continues at block 707, else the component continues at block 704. In block 704, the component subscribes to event notifications for the selected node. In block 705, the component sends a contact message to the selected node. In block 706, the component receives a response from the selected node establishing the connection. In block 707, the component sends a reconnect message to the selected node to instruct the selected node to re-form its portion of the control tree. The component then loops to block 701 to select the next node in the list.

Figure 8:
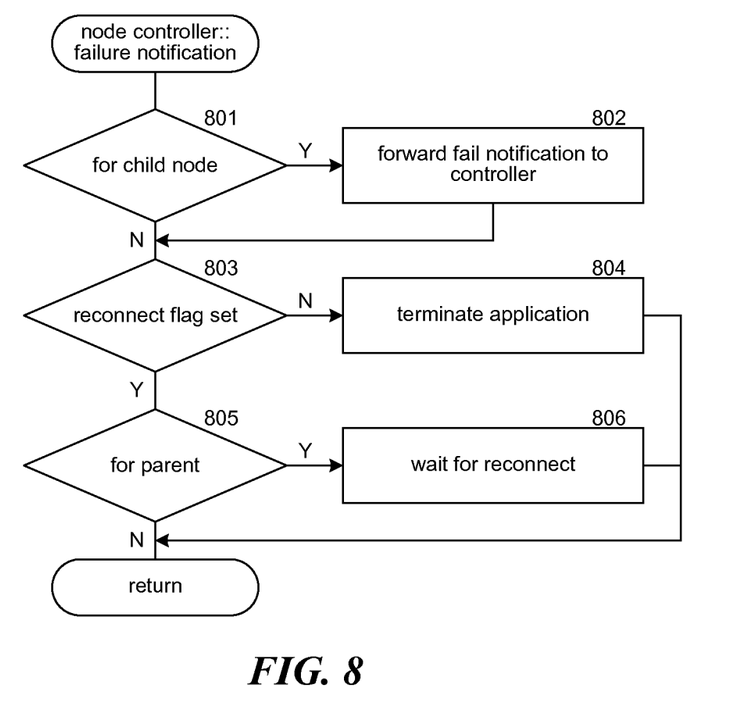
FIG. 8 is a flow diagram that illustrates the processing of a failure notification component of the node reconnection controller in some embodiments.

FIG. 8 is a flow diagram that illustrates the processing of a failure notification component of the node reconnection controller in some embodiments. The component is invoked when a node receives a notification of a failure. In decision block 801, if the notification is for a child node, then the component continues at block 802, else the component continues at block 803. In block 802, the component forwards a failure notification to the controller at the service nodes via the control tree so that the reconnection process can be initiated and continues at block 803. In decision block 803, if the reconnect flag is set, then the component continues at block 805, else the component continues at block 804. In block 804, the component terminates the application executing at the node and then returns. In decision block 805, if the failure notification is for the parent node, then the component continues at block 806, else the component returns. In block 806, the component waits for a reconnect message to be received from a new parent node and then returns.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. The reconnection system may use various other approaches to reconnecting the control tree. For example, when a child node detects that its parent node has failed, the child node may contact an ancestor of its parent node, and that ancestor node may be responsible for selecting a new parent node for the child node. As another example, a parent node may be responsible for detecting the failure of its child nodes and can be responsible for selecting a new parent node for each child node of the failed nodes. In some embodiments, an application-generated error such as an "out of memory" error results in the application being terminated rather than the control tree being re-formed. However, a node may detect errors in connections or errors reported by the event notification system that are reported up the control tree to the controller. Each node may have multiple processors that can each be executing an instance of the application. In such a case, one processor may be designated to perform the node reconnection controller functions. In some embodiments, the reconnection system may, before reconnecting, check on the health of any node that has previously failed. If a previously failed node is reported as being healthy, then that node is removed from the list of failed nodes so that it can be part of the re-formed control tree. Each leaf node of the control tree may send a notification via the control tree to the controller indicating that its reconnection is completed. Upon receiving such a notification from all the leaf nodes, the controller sends a message down through the control tree indicating that the reconnection is complete. In some embodiments, each node may not be provided with the complete placement list. Rather, each parent node may, for each of its child nodes, identify the nodes that are to be the descendant nodes of that child node and pass a list of only those descendant nodes to each child node. Accordingly, the invention is not limited except as by the appended claims.

I claim:

1. A method performed by a node in a computing system for responding to a failure during parallel execution of instances of an application at multiple nodes without terminating the application, the nodes and connections between the nodes forming a control tree in which parent nodes are connected to child nodes, the method comprising:
receiving at a parent node an indication to reconnect the control tree with new child nodes as child nodes of the parent node;
for each current child node of the parent node that is not a new child node, terminating the connection between the parent node and the child node; and
for each new child node,
when the new child node is a current child node of the parent node, maintaining the connection with the new child node; and
when the new child node is not a current child node of the parent node, establishing a connection with the new child node so that the new child node is a child node of the parent node.

2. The method of claim 1 including notifying each child node to reconnect the control tree with new child nodes.

3. The method of claim 1 including storing at the parent node a placement list of nodes allocated to the application and wherein the received indication to reconnect the control tree identifies nodes that have failed.

4. The method of claim 3 including identifying the new child nodes from the nodes of the placement list that have not failed.

5. The method of claim 1 wherein establishing the connection with the new child node includes opening a port for listening, sending a contact message to the new child node, and receiving a response to the contact message from the new child node via the open port to establish the connection.

6. The method of claim 5 wherein the contact message includes an indication to reconnect the control tree with nodes that have not failed.

7. The method of claim 5 wherein establishing the connection with the new child node includes subscribing to receive a notification when the new child node fails.

8. The method of claim 1 wherein terminating the connection between the parent node and the child node includes sending a release message to the child node and waiting for the connection with the child node to close.

9. The method of claim 8 wherein terminating the connection further includes unsubscribing to receive a notification when the child node fails.

10. A computing system for executing in parallel instances of an application at multiple nodes, comprising:
a controller that
directs nodes to execute instances of the application and to connect with other nodes to form a control tree in which parent nodes are connected to child nodes;
detects a failure of a node of the control tree during executing of the application; and
directs the nodes that have not failed to reconnect to re-form the control tree without the failed node and without terminating an instance of the application executing at a node that has not failed; and
a plurality of nodes such that each of the plurality of nodes:
executes an instance of the application;
upon being directed to connect, establishes connections for that node of the plurality of nodes with child nodes as current child nodes; and
upon being directed to reconnect, identifies new child nodes that are to be child nodes of that node of the plurality of nodes within the re-formed control tree, maintains the connection with any current child node that is also a new child node, terminates the connection with any current child node that is not also a new child node, and establishes a connection with any new child node that is not a current child node
such that the execution of the instance of the application at that node is not terminated.

11. The computing system of claim 10 wherein the controller directs the nodes to connect by sending a message to connect to a root node of the control tree and to reconnect by sending a message to reconnect to the root node.

12. The computing system of claim 11 wherein the root node propagates each message to connect and each message to reconnect to its child nodes and the child nodes propagate each message to connect and each message to reconnect to their child nodes.

13. The computing system of claim 12 wherein the message to connect includes a placement list of nodes allocated to the application and the message to reconnect includes an indication of a node that has failed.

14. The computing system of claim 13 including a node that identifies new child nodes when reconnecting from the nodes of the placement list that have not failed.

15. A computer-readable storage medium that is not a transitory, propagating signal containing computer-executable instructions for controlling a parent node to respond to a failure during execution of instances of an application in parallel at multiple nodes without terminating the execution of the instance of the application at the parent node, the nodes and connections between the nodes forming a control tree in which nodes are connected in a parent-child relationship, the computer-executable instructions comprising:

a component that, while an instance of the application is executing at the parent node, receives at the parent node an indication to reconnect to re-form the control tree with new child nodes of the parent node; and a component that, after receiving the indication to reconnect, maintains the connection with a current child node that is a new child node, terminates the connection with a current child node that is not a new child node, and establishes a connection with a new child node that is not a current child node.

16. The computer-readable storage medium of claim 15 including a component that notifies each new child node to reconnect the control tree with new child nodes.

17. The computer-readable storage medium of claim 15 including a component for storing at the parent node a placement list of nodes allocated to the application and wherein the received indication to reconnect the control tree identifies nodes that have failed.

18. The computer-readable storage medium of claim 15 wherein the component that establishes a connection with a new child node sends a reconnect message to the new child node and receives a response to the reconnect message from the new child node to establish the connection.

19. The computer-readable storage medium of claim 15 wherein the component that terminates a connection with a child node sends a release message to the child node and waits for the connection with the child node to close.

20. The computer-readable storage medium of claim 15 wherein the component that maintains a connection sends a reconnect message to the child node.

\* \* \* \* \*